United States Patent
Schrader et al.

(10) Patent No.: US 8,167,107 B2
(45) Date of Patent: May 1, 2012

(54) WET CLUTCH

(75) Inventors: Scott Schrader, Canton, OH (US); Yang Liang, Waterloo, IA (US)

(73) Assignee: Schaeffler Technoloiges AG & Co. KG, Herzogenaurach (DE)

( * ) Notice: Subject to any disclaimer, the term of this patent is extended or adjusted under 35 U.S.C. 154(b) by 734 days.

(21) Appl. No.: 12/221,027

(22) Filed: Jul. 30, 2008

(65) Prior Publication Data

US 2009/0038905 A1 Feb. 12, 2009

Related U.S. Application Data

(60) Provisional application No. 60/962,735, filed on Jul. 31, 2007.

(51) Int. Cl.
*F16D 13/64* (2006.01)
*F16D 13/72* (2006.01)

(52) U.S. Cl. ........... 192/107 M; 192/107 R; 192/113.36

(58) Field of Classification Search .............. 192/113.34, 192/113.36

See application file for complete search history.

(56) References Cited

U.S. PATENT DOCUMENTS

| | | | | |
|---|---|---|---|---|
| 2,690,248 | A * | 9/1954 | McDowall | 192/113.36 |
| 2,733,797 | A * | 2/1956 | Almen et al. | 192/107 R |
| 4,674,616 | A * | 6/1987 | Mannino, Jr. | 192/107 R |
| 5,911,292 | A * | 6/1999 | Schade et al. | 192/70.12 |
| 2006/0124430 | A1* | 6/2006 | Mizuno et al. | 192/107 M |
| 2007/0199794 | A1* | 8/2007 | Miyazaki et al. | 192/113.36 |

* cited by examiner

*Primary Examiner* — Richard M. Lorence
(74) *Attorney, Agent, or Firm* — Davidson, Davidson & Kappel, LLC

(57) ABSTRACT

A wet clutch having friction surfaces, where at least one friction surface consists of a porous friction lining with essentially flat surface placed on a supporting part. In order to achieve better cooling of the friction lining and supporting part and of the opposing friction surface by means of cooling oil pressed through the porous friction lining under pressure, the friction lining is provided with at least one cut-out.

8 Claims, 1 Drawing Sheet

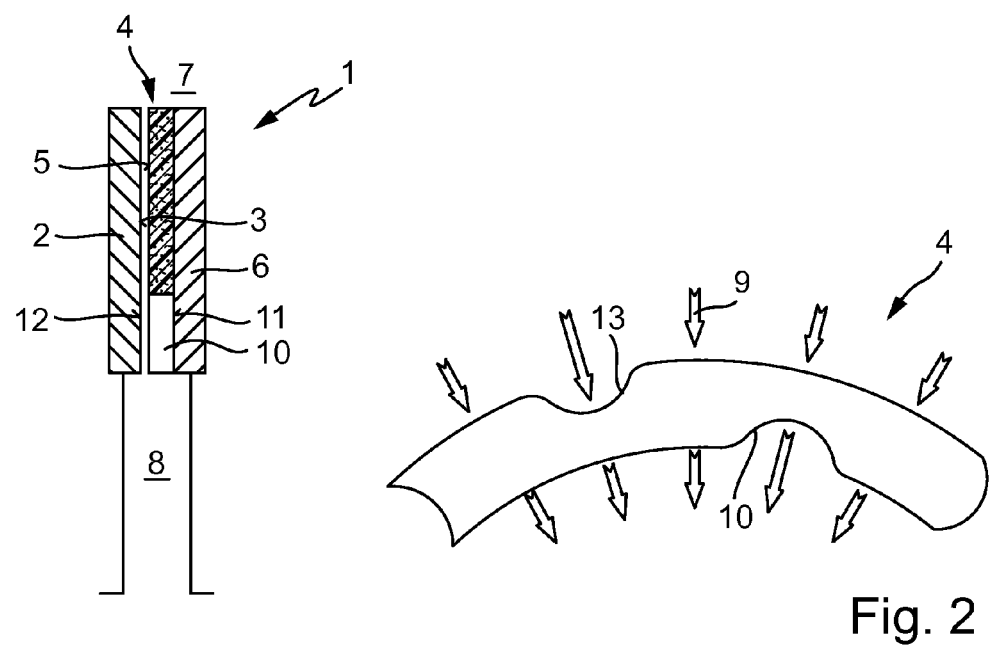
Fig. 1
Fig. 2
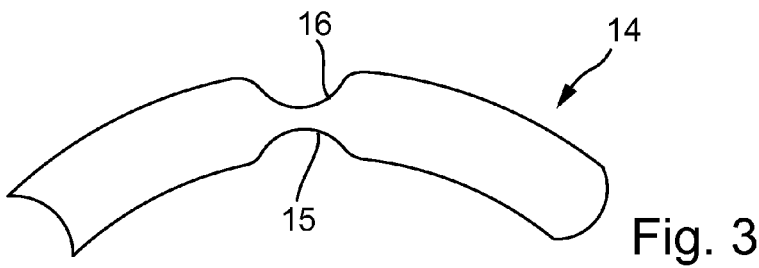
Fig. 3
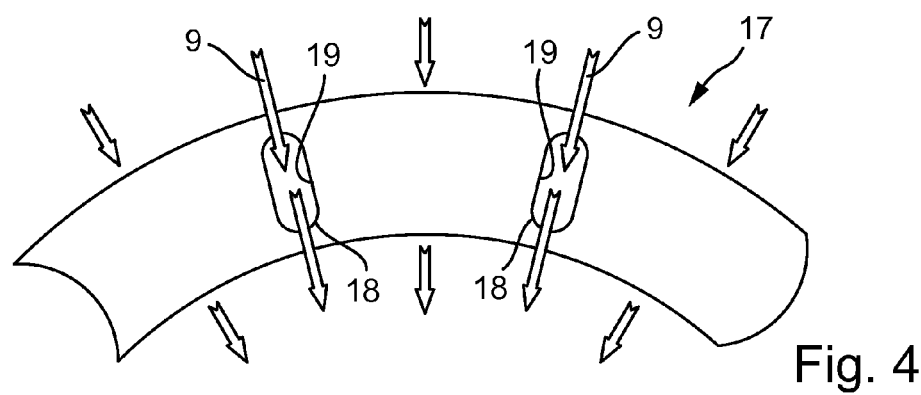
Fig. 4

WET CLUTCH

Priority to U.S. Provisional Patent Application Ser. No. 60/962,735, filed Jul. 31, 2007, is claimed, the entire disclosure of which is hereby incorporated by reference herein.

This invention relates to a wet clutch having at least two friction surfaces that may be brought into friction contact with each other, where at least one friction surface is formed with an inner and an outer circumference and a defined thickness by means of the surface of a ring-shaped friction lining placed on a supporting part, which friction lining has an essentially flat friction surface and a defined porosity.

BACKGROUND

Wet clutches are known that have friction linings in which embossing is provided. Such embossing is produced by pressing a profiled die onto the surface during the manufacturing process. In the area of a raised profile of the die, the porous material of the friction lining is more severely compressed than on non-profiled surfaces. That results in a friction lining that exhibits grooves at the more severely compressed places and has no porosity in the area of these grooves, i.e. is impervious. The grooves are provided to carry a stream of oil for cooling from an outer side across the lining to a radially inner side of the friction lining when the wet clutch is engaged, so that in the area of the grooves a cooling effect results on the lining and on the adjacent opposing friction surface. Because of the deformation of the friction lining in the area of the grooves, transporting of cooling oil through the pores of the friction lining is no longer possible at these places; the thermally insulating properties of the friction lining make cooling these areas difficult. This makes a relatively high flow volume of cooling oil necessary, and the large proportion of the surface taken up by the necessary grooves is very high in comparison to the effective friction surface.

SUMMARY OF THE INVENTION

An object of the invention is to improve the cooling circumstances in a wet clutch. Moreover, the improvement may be accomplished through an optimized form of the friction lining. In so doing, an effort should be made to obtain uniformly high porosity of the friction lining over the entire friction lining, if possible. A greater flow of cooling oil through the friction lining, in particular through the pores of the friction lining, should be achieved.

An embodiment of the present invention provides a wet clutch having at least two friction surfaces that may be brought into friction contact with each other, where at least one friction surface may be formed with an inner and an outer circumference and a defined thickness by means of the surface of a ring-shaped friction lining placed on a supporting part, which friction lining may have an essentially flat friction surface and a defined porosity, the friction lining having at least one cut-out that reduces the surface and extends through the entire thickness of the friction lining.

A cut-out in the friction lining increases the area of entry of the cooling oil into the cross section of the friction lining, so that the flow volume through the friction lining may be effectively greater. Another benefit may be the wetting of the opposing friction surface, which is usually made of metal. Thus the cooling oil can come into contact directly with the metal and cool it in the area of the cut-out, whereas in the case of friction linings embossed with corresponding patterns a non-porous, compressed layer of the friction lining insulates the surface thermally on the side of the clutch to which the friction lining is attached. In this sense, a cut-out as described in the invention may be distinctly different from a grooved surface embossed in the friction lining.

Another advantage of the invention can be achieved if the wet clutch is operated with slight slippage, so that the at least one cutout shifts slightly with respect to the opposing friction surface when the wet clutch is engaged, so that the free areas on the opposing friction surface which are cooled by cooling oil change as a result of this slippage. In this way, two cooling effects can be combined with each other. In the first place, a greater flow of cooling oil through the pores of the friction lining may be achieved by means of the increased area of entry created by the at least one cut-out, and thus better cooling of the friction lining itself. In the second place the opposing friction surface, and in addition the surface that receives the friction lining, may be cooled more effectively in the area of the cut-out, in particular when slippage has stopped.

The at least one cut-out can be made on the outside and/or inside circumference. It is also possible for a plurality of cut-outs to be provided, distributed around the outside and/or inside circumference. These cut-outs may be provided alternately outside and inside around the circumference, so that a cut-out is situated on the inside, and at the same location radially on the outside no cut-out. In this way a pattern is produced that can resemble a friction lining in the form of a wavy line. In contrast, cut-outs may be opposite each other radially on the inside, so that a friction lining is produced with narrow and wide places that repeat around the circumference.

A cut-out may also be rounded inward or angular in design. For example, circular segments formed by a secant or elliptical segments may be provided as cut-outs, or any conceivable free shape, for example in the form of a seashell. The transitions between the cut-out and the circumference of the friction lining may be rounded in a beneficial way.

Another embodiment of the invention includes the arrangement of one or more cut-outs distributed around the circumference within the friction lining, without contact with the inside and outside circumference. In this way, streams of cooling oil pressed from outside into the cross section of the friction lining can collect and be distributed again into the porous friction lining more effectively due to an increased in-flow area. Here too, a contact with the exposed metal surfaces of the supporting part carrying the friction lining may have an effect.

BRIEF DESCRIPTION OF THE DRAWINGS

FIG. 1 shows in broad outlines a depiction of a wet clutch having a friction lining provided with at least one cut-out;

FIG. 2 shows a section of a ring-shaped friction lining according to the invention, having cut-outs situated around the circumference, alternating radially on the inside and radially on the outside;

FIG. 3 shows a section of a friction lining according to the invention, having cut-outs situated radially inside and radially outside on the same circumference;

FIG. 4 shows a section of a friction lining according to the invention with openings centered and distributed around the circumference.

DETAILED DESCRIPTION

FIG. 1 shows in broad outlines a depiction of a wet clutch 1 in cross section, as it may be employed for example in a torque converter as a lock-up clutch. The torque converter lock-up clutch consists of an input part 2, which is connected in a rotationally fixed connection to a drive unit such as a combustion engine and may be part of a housing, for example a torque converter housing, or may be connected to the latter in a rotationally fixed connection. Input part 2 has an opposing friction surface 3 for the ring-shaped friction lining 4 with a friction surface 5. Wet clutch 1 is shown in the disengaged state; after the friction surface and the opposing surface are brought into proximity a contact is produced in the engaged state, and hence a frictional engagement which, beginning with a slip phase with a difference in speed of rotation between input part 2 and friction lining 4, leads to the state of adherence of wet clutch 1 at the maximum torque to be transmitted through wet clutch 1. Wet clutch 1 is engaged by an axial displacement of the output part, which serves as the supporting part 6 for frictional lining 4, and which may be a piston which is axially displaceable by means of an oil pressure and connected in a rotationally fixed connection to a transmission input shaft of a transmission.

During the process of engagement, or under particular operating conditions, for example to damp peaks of the drive unit, the existing slippage produces an input of heat into the wet clutch, so that the latter must be cooled in order to counteract heating of the oil that wets the wet clutch 1—the latter is surrounded by a closed housing to that end—and of the frictional lining, which can be damaged by high temperatures. The oil itself may also serve as the cooling oil. To this end, the frictional lining 4, which may be made of organic material, for example of paper fibers and appropriate strengthening components such as resin or glue, is of porous structure so that a flow volume of the cooling oil can flow in the direction of arrow 9 from the pressurized chamber 7 into a chamber 8 with lower pressure. At a defined pressure differential and with the defined geometric dimensions, the flow volume can be optimized by specifying the porosity.

To increase the flow volume for improved cooling without increasing the pressure, the invention proposes that at least one cut-out be provided in the friction lining, which promises improved distribution of the cooling oil in the cross section of the friction lining. In this case, cut-out 10 is not compressed more severely in a pressing process than the rest of the friction lining, which would result in occupancy of supporting part 6 over the entire friction lining surface. Instead, the cut-out is removed from friction lining 4. In this way, an additional open area 11 appears on supporting part 6, which can be cooled in addition to the corresponding open area 12 by the cooling oil. This is beneficial in particular when wet clutch 1 is operated with little slippage, for example at low revolutions per minute, so that with the slow relative rotation of wet clutch 1 while otherwise wet clutch 1 is engaged the free areas slowly shift, and as a result are exposed to the cooling by the cooling oil.

FIG. 2 shows a partial view of an advantageous embodiment of a friction lining 4 according to the invention, as it can be employed for example in the wet clutch 1 of FIG. 1. In addition, friction lining 4 has a plurality of cutouts 10 distributed around the circumference, which are placed on the radially inward-situated circumference of friction lining 4. In the same way, the outer circumference of friction lining 4 has cutouts 13. Cutouts 10, 13 are situated at an offset from each other around the circumference of friction lining 4. The penetration of cooling oil into the cross section of friction lining 4 in the direction of arrow 8 is made easier at the cut-outs 13, since the area of entry is increased by the ratio of the excised circle segment to the cross sectional area newly formed by the cut-out 10, and at the same time the distance to be traversed to the inner circumference is shortened. In similar fashion, the discharge area and the distance traversed are made smaller by the cut-outs 10. The effect of the cooling of the open areas 10, 11 was already described in conjunction with FIG. 1.

The exemplary embodiment of a friction lining 14 depicted in a partial cross section in FIG. 3 can also be used advantageously in place of the friction lining 4 in FIG. 1. In contrast to the friction lining 4, the radially inner cut-outs 15 and radially outer cut-outs 16 distributed around the circumference are situated on the same circumference, so that they are opposite each other. This is especially beneficial, since an especially short traverse distance can be achieved with entry and discharge areas comparable to the cut-outs 10, 13 of FIG. 2. As already described earlier, the cut-outs 15, 16 can have different forms, with the free shapes depicted in FIG. 3, which are of shell-like design and do not correspond entirely to a circle segment cut by a secant, having proven themselves the best. In an advantageous way, the transitions between the cut-outs 15, 16 and the outer or inner circumference are rounded.

FIG. 4 shows a partial view of an exemplary embodiment of a friction lining 17 having cut-outs 18 enclosed within the outer and inner circumference, which are distributed around the circumference and preferably provide open areas 19 of the adjacent opposing friction surface and of the supporting part 6 (FIG. 1). In this way, cooling oil penetrating via arrow direction 8 can collect in the openings 18 and cool the open areas 19. Because of the pressure differential prevailing between outer and inner circumference, hot cooling oil continues to move radially inwardly, and less hot cooling oil can flow after it into the openings.

It goes without saying that the cut-outs 10, 13, 15, 16 of friction linings 4 and 14 can be combined in an advantageous way with the openings 18.

REFERENCE LABELS

1 wet clutch
2 input part
3 opposing friction surface
4 friction lining
5 friction surface
6 supporting part
7 chamber
8 chamber
9 arrow
10 cut-out
11 open area
12 open area
13 cut-out
14 friction lining
15 cut-out
16 cut-out
17 friction lining
18 cut-out
19 open area

What is claimed is:

1. A wet clutch comprising:
   a first friction surface;
   a supporting part; and
   a ring-shaped friction lining having a surface on the supporting part, the ring-shaped friction lining having a flat ring-shaped second friction surface, having an inner and an outer circumference and having a thickness defined by a distance between the second friction surface and the surface on the supporting part, the friction lining having a defined porosity and having a porous structure permitting oil to flow through the porous structure from the outer circumference to the inner circumference when the flat second friction surface contacts the first friction surface, wherein the friction lining has at least one cut-out reducing an extent of the friction lining between the inner and outer circumference and extending through the entire thickness of the friction lining, wherein the at least one cut-out is on the outer and/or inner circumference of the friction lining, wherein the at least one cut-out includes a first cut-out situated on the outer circumference of the friction lining and another cut-out situated on the inner circumference of the friction lining, the cut-outs being situated opposite each other.

2. The wet clutch as recited in claim 1 wherein the at least one cut-out forms a rounded indentation.

3. The wet clutch as recited in claim 1 wherein the at least one cut-out further includes a plurality of additional cut-outs distributed around the circumference of the friction lining.

4. The wet clutch as recited in claim 1 further comprising at least one additional cut-out recessed in the interior of the friction lining without contacting the inner circumference and without contacting the outer circumference.

5. The wet friction clutch as recited in claim 1 wherein the friction lining is made of organic material.

6. The wet friction clutch as recited in claim 5 wherein the friction lining includes paper fibers.

7. The wet friction clutch as recited in claim 6 wherein the friction lining includes resin or glue.

8. A method for operating the wet friction clutch as recited in claim 1 comprising:

passing oil from the outer circumference to the inner circumference through the porous structure, the oil entering the at least one cut-out.

* * * * *